Patented June 26, 1945

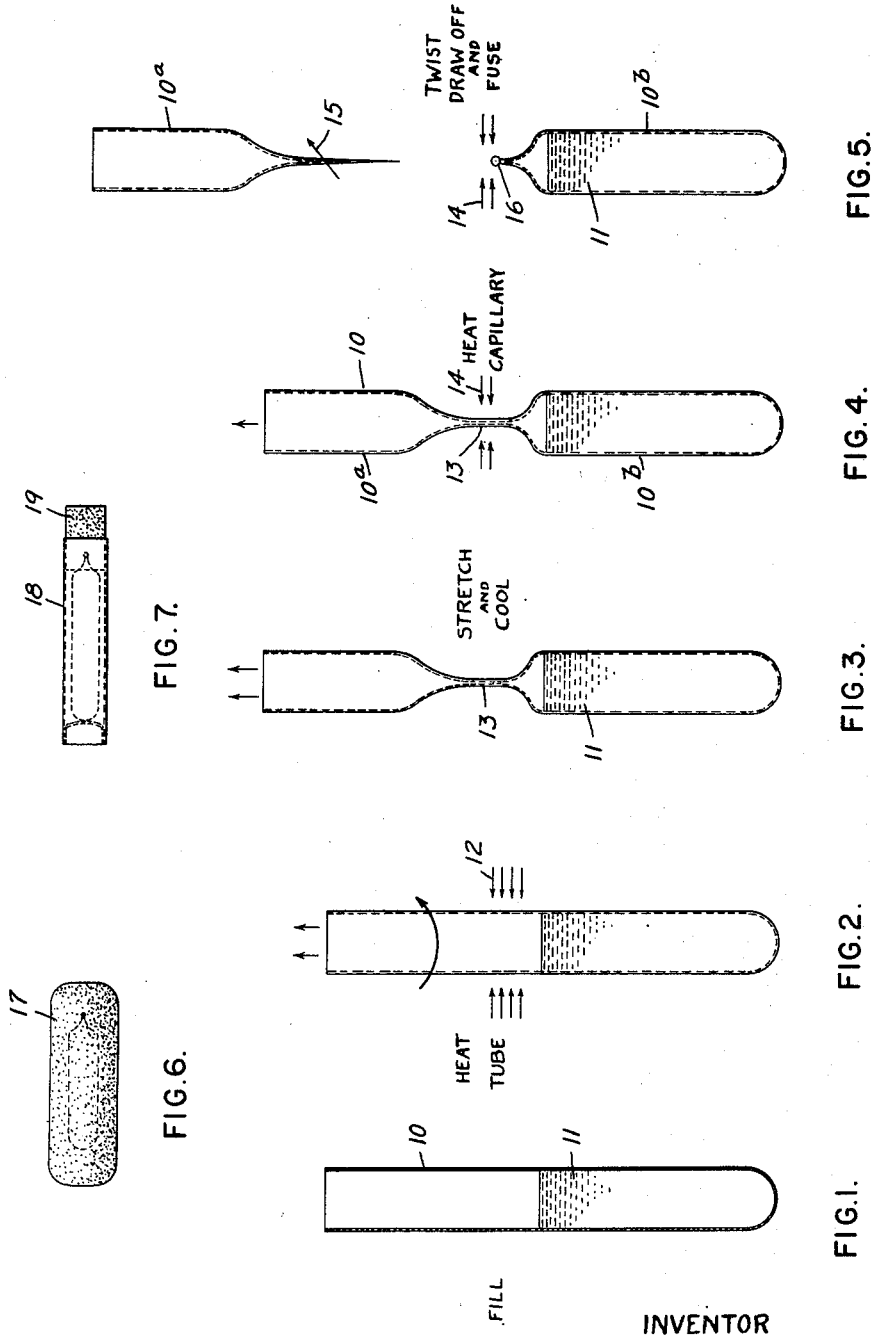

2,379,342

UNITED STATES PATENT OFFICE 2,379,342

METHOD OF SEALING FILLED TUBES

Frank J. Cozzoli, Plainfield, N. J.

Application March 21, 1942, Serial No. 435,667

2 Claims. (Cl. 49—77)

This invention relates to the art of hermetically sealing vessels, and more particularly to the art of sealing glass tubes filled with liquids so as to preserve the contents until the occasion arises for its use. By way of example, this invention is especially applicable to the sealing of thin walled glass tubes, after they have been filled with medicinal preparations such as iodine, ammonia and other preparations, to form small fragile capsules available for immediate use merely by crushing the glass container. Usually capsules of this character and for such purposes are wrapped in a gauze or padding or placed in a resilient casing that functions as a handy and convenient applicator through which the contents of the capsule quickly penetrates and is made available for use. The padding or casing prevents injury to the fingers during the act of crushing and at the same time confines the bits of glass to the inner regions of the swab.

As above indicated, tubes for this purpose are usually made of glass with a wall thickness thin enough to be easily crushed with the fingers, and the fragile character of the tube, in itself, presents difficulties in filling and sealing. The friable nature of containers for pharmaceutical preparations gives rise to the further problem of avoiding the danger incident to the generation of gas pressure in the tube and the entrapping of volatile gases during the heating and sealing off process.

Heretofore, the glass containers or tubes have been preformed with a relatively long and tenuous stem portion through which the vessel is later filled by a vacuum process and thereafter sealed high in the stem. With such methods, a more or less complex exhausting apparatus is required to evacuate the air from the tube so that the liquid may be drawn through the long stem into the bulbous portion. This prior method of filling and sealing is, however, a tedious and time consuming operation requiring expensive complicated machinery of a special nature, and expertness and skill in operating.

A primary object of the present invention is to render available a method or process that may be expeditiously and efficiently used in the filling and sealing of tubes close to the level of the contents, and to effect the sealing of the filled tubes without danger of tube fracture.

A further aim of the invention is to render available a method of sealing filled tubes which insures that the sealed portion of the container will be air and leak proof so that the risk of loss of the contents due to spoilage, evaporation, or premature leakage is eliminated.

Still another aim of the invention is to render available a method of filling and sealing glass tubes which may be practiced by hand, or with the aid of relatively few simply constructed and designed units of equipment, and which may be efficiently performed to effect a neat thermal sealing of the container close to the level of its contents with a minimum of danger of container fracture during the operation.

By way of illustration, my improved method of filling and sealing may be advantageously practiced by starting with a plain cylindrical glass tube and pouring into the open end thereof the desired quantity of material to be sealed therein. A band of heat, derived from a burner or other suitable source, is applied to the surface of the tube at a zone or region just above the level of the contents, until that intermediate zone becomes soft and plastic. Meanwhile, the gases that are given off by the contents due to the heating, are free to escape through the relatively large and unrestricted open end of the cylinder. After the heating and the softening of the wall of the tube has been uniformly effected, the heat is removed and the portions of the tube on opposite sides of the softened area are quickly stretched apart to form a constricted neck portion close to but just above the contents. It is important at this stage not to stretch the two ends of the tube to the point of closing, but just far enough to effect a substantial reduction in tube diameter while still leaving a very small passageway through the reduced neck. Such a passageway is essential in order that the gases that may still be given off, due to the initial heating, may escape without blowing a hole through the softened portion of the tube.

After stretching in this manner, the tube is allowed to cool until the stretched portion solidifies. During the cooling stage such volatile gases as may come off the liquid, freely escape through the restricted neck or capillary portion until the pressure outside and inside are in equilibrium.

When sufficiently cooled, a narrower band of heat is again applied to a midzone of the capillary portion for a relatively short interval until the glass wall at that point has again become soft. This second heating need not be long because of the small amount of glass in the capillary to be softened at the final heating stage, and consequently the contents of the tube do not heat up or become volatile to the extent of producing any serious pressure. After the glass is softened the two ends of the tube are quickly drawn apart and the needled end remaining on the container portion is instantly fused over tight by momentary continued application of the heat.

It has been found that a more uniform application of the bands of heat may be applied to the tube if the tube is rotated or at least oscillated about its axis during the first and second heating stages. Also, the final sealing may be effected with a greater degree of certainty, if the portions of the tube at each side of the zone of the second and final stage of heating, are given a relative twisting movement as the two portions are drawn apart and separated from one another. Such twisting of the capillary has the effect of pinching it closed and quickens the sealing off operation, in addition to making the seal more certain and effective. The fusing of the needle-like end of the closed capillary immediately follows to form a neat balled tip.

Other objects and advantages will be in part indicated in the following description and in part rendered apparent therefrom in connection with the annexed drawing.

To enable others skilled in the art so fully to apprehend the underlying features hereof that they may embody the same in the various ways contemplated by this invention, a drawing depicting a preferred typical construction has been annexed as a part of this disclosure and, in such drawing, like characters of reference denote corresponding parts throughout all the views, of which the drawing illustrates the steps of the process above outlined and in which:

Figure 1 represents, in cross section, an open ended tube that has been filled to the desired level with a liquid preparation.

Fig. 2 illustrates the application of a band of heat to a zone of the tube just above the liquid.

Fig. 3 illustrates the general appearance after the heat is removed and after the tube has been stretched and cooled.

Fig. 4 represents the second application of heat to a localized region of the capillary portion, and, Fig. 5, the drawing off and fusing step of the process.

Fig. 6 is a detail view of a filled and sealed capsule packaged in gauze or cotton.

Fig. 7 is a detail view of a filled and sealed capsule inserted in a transparent resilient container.

In the practicing of the method herein outlined, the tubes to be filled and sealed may be straight walled cylinders, or at least, with relatively large diametered tubular top portions, in order to make the filling thereof a simple task. In the drawing the tube 10 is of cylindrical character and into which has been poured a measured quantity of a liquid preparation 11. The tube being open ended, and of substantial diameter throughout its length, the operation of filling, when the present method of sealing is practiced, may be effected expeditiously and performed quite readily by hand.

After filling, a flame or suitable heating means, represented at 12 in Fig. 2, is applied to the tube at a zone just above the top of its contents and intermediate the ends of the tube to soften the walls of the tube close to the top of the contents and for a short distance beyond. As the step of stretching effected must reduce the diameter of the filled tube from a relatively large to a relatively small size, the flame applied should spread somewhat along the axis of the tube to soften a band thereof so that the stretching will not thin the glass at any one point too greatly. Uniformity in the heating of the walls of the tube is best effected if the tube as a whole is rotated or at least oscillated slightly, to distribute the heat more evenly.

When the glass wall has softened and is in a plastic stage, the heat is removed and the tube quickly stretched out to a position such as represented by Fig. 3 to form a reduced neck portion 13 of capillary proportions immediately above the level of the contents. This stretching out must be carefully performed so as neither to separate the tube at the softened region nor to close the stretched capillary portion.

The importance of stretching a large filled tube to capillary size, instead of sealing it off at this stage, will become apparent when regard is given to the fact as the tube, with the present method, is filled with a preparation, and the heating of the tube close to the liquid contents, also warms the contents and tends to produce a gas or vapor. If the closing of the tube were to be attempted at once, the gases generated therein by the heating would create a pressure that would "blow" the still plastic portion of the glass.

After stretching to the form represented in Fig. 3, the tube and its contents is allowed to cool and during the cooling period the gasses that may continue to be given off by the warmed liquid, are permitted to escape through the capillary portion 13 and out the open end of the tube. The arrows at the top of Figs. 2 and 3, represent the outgoing gases or vapors that would if confined or trapped, not only interfere with sealing, by blowing out or forming gas bubbles in the softened glass, but which would build up and produce a pressure within the capsule such as is likely to cause immediate fracture or breakage at the slightest jar. However, by allowing the tube and its contents to become cooled following the initial and partial closing operation, as by standing with the filled and unfilled portions aligned, as indicated in Fig. 3, those difficulties are avoided. The cooling period may be hastened by the application of a gentle stream of cool air to the heated portion.

After a sufficient period of cooling, a flame 14, preferably a smaller or narrower band, is applied to an intermediate and localized region of the capillary portion 13 of the tube (see Fig. 4) until that local portion again becomes soft and plastic. This second stage of heating will not, it will be seen, heat the major portion of the tube or its contents to any appreciable extent because the amount of glass requiring heating at that point is comparatively slight and softens almost instantaneously. Accordingly, the concentrated and localized final heating is accomplished without danger of heating the contents of the capsule to the point that would cause the formation of gaseous vapor therein. During this second stage of heating both end portions of the tube may again be rotated about the longitudinal axis and uniform distribution of heat at the localized point quickly attained.

When the capillary portion has become softened by the second heating, the empty and filled portions 10$^a$ and 10$^b$ may be drawn apart as represented in Fig. 5, preferably accompanied by a slight rotation of one of the portions 10$^a$ or 10$^b$ relative to the other as indicated by the arrow 15.

The drawing off of the open end portion 10$^a$, needles out the points of the capillary portion 13 and the point remaining on the filled portion 10b of the tube is immediately fused by the heat of the flame to form a neat balled tip 16 on the filled tube. The sealed capsule is then ready for wrapping in padding 17 (Fig. 6) or for insertion in a resilient transparent container 18 tipped with cotton 19 (Fig. 7).

By proceeding in the manner outlined, one is enabled to fill open ended tubes with a minimum of apparatus and difficulty and then seal the filled tubes close to the level of their contents in a way that effectively provides for the immediate escape or relief of gas pressure that may form. With the present method, the initial heating of the filled tube (Fig. 2) reasonably close to the level of its contents causes the heated portion of the tube immediately above the level of the contents to fold over close to that level during the stretching and then form the capillary portion indicated at 13. The portion of the tube above the capillary, which remains empty, stretches out with a longer curve owing to the absence of any material therein that would help absorb or conduct heat away as is accomplished by the material 11 in the portion below the capillary.

In some instances, depending largely upon the volatile nature of the preparation being packaged, the second heating may, in effect, be a continuation of the first. That is to say, after the tube is filled and the first band of heat applied, the flame may be reduced (or moved slightly away) during the stretching of the tube to capillary size. The gases or vapors formed by the heating go off through the capillary, as before, and the major portion of what will soon be the end of the tube, immediately begins to chill and solidify. The reduced, or slightly removed flame still, however, gives off sufficient heat to keep the reduced capillary portion soft, and by moving the flame axially along the tube to the region of the reduced portion where severing is to occur and where the drawn glass is the thinnest, the heat from the reduced flame burns through the thin walled capillary and fuses the end of the filled portion closed. The heat is allowed to stay on, after the severing operation, until the needled end of the filled portion of the tube reduces down to a neat balled tip.

Some users of applicators of this character prefer that the capsules be rendered easily opened by breaking off of the tip 16 and with the present method of sealing the tipped end may be made as delicate or as long as desired merely by regulating the extent of the initial heating and stretching operations and the point or location of the second application of the heat to the capillary in relation to the nearness of the swelled out filled portion of the tube proper.

Where necessary or desirable the partially closed tube may be connected at its top to an evacuating machine and the final stages of heating and sealing (Figs. 4 and 5) performed to bring about a close sealing of preparations under a partial vacuum.

From the foregoing it will be apparent that a comparatively simple and easy method of filling and close sealing glass containers may be practiced without danger of producing excessive internal pressure or defective or leaky seals. The initial heating of a tube and the immediate contraction thereof close over the level of its contents and allowing the closed over portions to solidify free of internal pressure, produces not only a smooth symmetrical end to the capsule, but a strong end that effectively resists any pressure that may remain following the final heating stage and also any pressure that may be reasonably expected during the storage of the filled and sealed capsules. The expression "close to the contents," "close over," "close sealing" and the like, as herein used, refer to the proximity of the end wall to the contents, formed in practicing this method of sealing a filled tube, i. e., with the present invention in forming a closure, the body portion of the tube that contains the preparation is closed in at a zone just beyond the level of the preparation therein so that a substantially full capsule is obtained in which the axial length of the unfilled portion of the sealed tube is comparatively small in relation to the length of the filled portion. Thus, in the applicators illustrated, if the total length of the sealed capsule is taken as 11 the length of the filled portion is approximately 9 of the parts and the length of the unfilled portion is 1 part and the balled tip 1 part. Heavier walled tubes may be filled and sealed with a strong and symmetrical end in the manner explained above with equal facility and certainty in the closure.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. A method of closing the open end of a cylindrical glass tube partly filled with a liquid to form a seal close to the liquid therein which consists in heating the body of the tube at a region close to the liquid contained in the filled portion until the glass is soft, removing the heat and drawing out the body of the tube at the softened region to capillary proportions thereby to form a substantially closed end on the tube body adjacent the contents with a relatively small bored connecting neck portion intermediate the said substantially closed end and the open end of the tube fo rventing gases generated on the heating of the liquid incident to the heating of the body of the tube close to the liquid, then cooling the tube and its contents while continuing to vent excess gas through the capillary opening in said small bored connecting neck portion, then applying heat to a localized region of the neck portion until that portion becomes soft and then twisting the tube at the softened neck portion to close the capillary opening therethrough thereby completing the formation of a closed end wall on the filled body portion of the tube close to its contents and simultaneously drawing the tube apart at said twisted portion and fusing the twisted end of the capillary neck remaining on the sealed end thus formed to finish the seal.

2. A method of closing the open end of a cylindrical glass tube partly filled with a pharmaceutical preparation to form a seal close to the preparation therein which consists in heating the body of the tube at a region close to the preparation contained in the filled portion until the glass is soft, removing the heat and drawing out the body of the tube at the softened region to capillary proportions thereby to form a substantially closed end on the tube body adjacent the contents with a relatively small bored connecting neck portion intermediate the said substantially closed end and the open end of the tube for venting gases generated on the heating of the preparation incident to the heating of the body of the tube close to the preparation, then cooling the tube and its contents while continuing to vent excess gas through the capillary opening in said small bored connecting neck portion, then applying heat to a localized region of the neck portion until that portion becomes soft to close the capillary opening therethrough thereby completing the formation of a closed end wall on the filled body portion of the tube close to its contents and simultaneously drawing the tube apart and fusing the end of the capillary neck remaining on the sealed end thus formed to finish the seal.

FRANK J. COZZOLI.